United States Patent [19]

Pera et al.

[11] Patent Number: 5,066,334

[45] Date of Patent: Nov. 19, 1991

[54] FUNGICIDAL AND CORROSION INHIBITING PAINT PIGMENTS

[75] Inventors: John D. Pera, Cordova; Loel L. Hickman, Memphis, both of Tenn.; Lawrence S. Conoway, Dundee, Miss.

[73] Assignee: Buckman Laboratories International, Inc., Memphis, Tenn.

[21] Appl. No.: 451,604

[22] Filed: Dec. 19, 1989

[51] Int. Cl.$^5$ .................................................. C09C 1/02
[52] U.S. Cl. .................................. 106/462; 106/14.21; 106/14.33; 106/14.39; 106/482; 428/357; 428/402; 428/403; 428/404
[58] Field of Search ................. 106/462, 14.21, 14.33, 106/14.39, 14.3, 482; 428/357, 402, 403, 404

[56] References Cited

U.S. PATENT DOCUMENTS

| | | | |
|---|---|---|---|
| 3,033,700 | 5/1962 | Buckman et al. | 106/462 |
| 3,060,049 | 10/1962 | Buckman et al. | 106/462 |
| 3,380,836 | 4/1968 | Robinson | 106/462 |

Primary Examiner—William R. Dixon, Jr.
Assistant Examiner—Anthony J. Green
Attorney, Agent, or Firm—Finnegan, Henderson, Farabow, Garrett & Dunner

[57] ABSTRACT

The present invention relates to a silica-coated calcium pyroborate pigment in particulate form and to its use as a corrosion inhibitor and film preservative in paints.

16 Claims, No Drawings

FUNGICIDAL AND CORROSION INHIBITING PAINT PIGMENTS

This invention relates to a silica-coated calcium pyroborate pigment in particulate form and to its use as a corrosion inhibitor and film preservative in paints. Additionally, it relates to pigment with reduced water solubility.

Barium metaborate has been used in paint compositions for film preservation and as a corrosion inhibitor, but because of its relatively high solubility in water of about 0.8% many problems have been encountered in paints. Barium metaborate is incompatible with some resins used in water-based paints and may also form large crystalline hydrates in some paints. The pigment itself develops severe caking problems on storage in bags. Barium metaborate also is leached fairly rapidly from paint films causing loss of effectiveness and unsightly crystal formation on paint film surfaces.

The problems encountered with barium metaborate can be partially alleviated by using silica-coated barium metaborate. The solubility in water is reduced to 0.25 to 0.40% and the caking tendency in bags is eliminated. However, leaching from paint films and loss of effectiveness remain as problems. The most serious problem with barium metaborate type pigments is, however, related to the toxicity of barium. Barium is considered to be a heavy metal and the presence of soluble barium in leachates of paint films, in the paint films themselves, and in the effluents of paint manufacturing factories has greatly retarded the use of soluble barium compounds in paints and plastics. Even if barium metaborate containing pigments could be insolubilized by encapsulation in some inert material, the toxic effects of barium would still be a problem if there is a possibility of ingestion of the pigment. This is because barium metaborates are soluble in dilute hydrochloric acid solutions which exist in the human digestive tract and stomach.

Calcium metaborate and calcium borosilicate have also been used as corrosion inhibiting pigments. However, the calcium metaborate has about the same solubility as the silica-coated barium metaborate and has most of the same problems related to water solubility. Calcium borosilicates also have water solubilities in the range of 0.32 to 0.38% and suffer from the same problems already mentioned.

It is accordingly a principal advantage of the present invention to provide a pigment which obviates the disadvantages of the prior art compositions of this character.

It is another advantage of the present invention to provide a pigment in a form which is less water soluble than products heretofore available.

It is still another advantage of the present invention to provide a pigment which, when incorporated as a portion of the total pigment in a paint composition, will provide mold resistance and corrosion resistance to the paint film derived from the paint composition.

These and other objects and advantages of our invention will become apparent as the description proceeds To accomplish the foregoing ends, this invention comprises the features hereinafter fully described and particularly pointed out in the claims. The following description sets forth in detail certain illustrative embodiments of the invention which are not to be construed as limiting the invention.

Broadly stated, the foregoing objectives and advantages are attained by employing a pigment in particulate form, having an effective diameter of less than 40 microns, where the pigment comprises a hydrated calcium pyroborate and a polymerized, amorphous, hydrated silica The polymerized silica contains both Si—OH and Si—O—Si bonds. As to the actual composition of the product on a moisture-free basis, that may vary as follows: CaO content, 45 to 61 parts; $B_2O_3$ content, 28 to 38 parts; and silica, 3 to 25 parts. As another characteristic the solubility of the product may vary from 0.06 to 0.18 part per 100 parts of water at 25° C. The water extract so obtained contains from 0.03 to 0.10 percent calcium expressed as CaO, from 0.02 to 0.09 percent boron expressed as $B_2O_3$, and at least 0.005 percent silica, all being percentages by weight.

The product of this invention in a preferred embodiment thereof may be formed by the precipitation of calcium pyroborate from a reaction mixture of a calcium salt, such as calcium oxide, calcium hydroxide, calcium sulfate or calcium chloride and borax or boric acid in the presence of liquid sodium silicate or potassium silicate. Alternately and somewhat less preferably, the product of this invention may be prepared by contacting calcium pyroborate particles with aqueous liquid sodium or potassium silicate in an aqueous environment. In either case, to the best of our knowledge the calcium pyroborate particles become partially coated with amorphous hydrated silica, which is a discontinuous coating.

Applicant's theory is that it would be logical to expect the formation of a substantial amount of calcium silicate by reacting a water soluble calcium pyroborate with an aqueous solution of a sodium silicate. It has been found, however, that the amount of calcium silicate so formed is insignificant as determined by either X-ray or infrared analytical procedures. Calcium pyroborate treated with sodium silicate by our processes, still contains calcium pyroborate in a chemically unchanged state. Both infrared spectra and X-ray diffraction patterns, as well as analyses for CaO and $B_2O_3$ indicate that the crystal lattice structure of the hydrated calcium pyroborate still exists in silica treated calcium pyroborate. We, therefore, believe that the silicate is present as a partially polymerized, amorphous, hydrated silica. The calcium pyroborate is bound by hydrogen bonds to the silica which is present principally in the form of silanol linkages (Si—OH). In addition to the silanol linkages, Si—O—Si bonds are also present. Furthermore, this silica seems to be on the surface of the calcium pyroborate particle, because if it were inside the crystal lattice, the X-ray diffraction patterns would probably be altered. We wish to point out, however, that the silica coating is not a completely inactive entity. In water, it is being depolymerized by the alkaline system and repolymerized by the presence of dissolved salts. There is no doubt that equilibria are established in the aqueous medium but the exact nature of these equilibria are not known. The silica in silica-coated calcium pyroborate is resistant to alkaline solubility effects.

It does not appear that the silica merely forms a film on the calcium pyroborate thereby reducing the solubility of the metaborate. Evidence to this effect follows from the fact that particles of calcium pyroborate which have been coated with sodium silicate by merely immersing such particles in an aqueous solution of a liquid sodium silicate and then drying the total mixture are unsatisfactory for the purposes of this invention. As a rule, we have found that when calcium pyroborate has been coated with a sodium silicate in this manner, the resulting product does not have the desired reduction of water solubility. In addition, we have found that other calcium borates, such as hydrates of calcium metaborate, calcium tetraborate and calcium sesquiborate, even when treated by the methods described herein, cannot be effectively coated with silica. Further, when such borates have been so treated, they do not exhibit the decreased solubility in water.

The solubility of silica-coated barium metaborate is approximately 0.25 to 0.30 g per 100 g of water at 25° C. We were very surprised to discover that the solubility of calcium metaborate which is 0.27 g per 100 g water was reduced only to 0.26 g per 100 g of water even when the compound was coated with sodium silicate equivalent to 16% silica based on the total weight of the pigment. The solubility of calcium tetraborate was reduced from 0.42 g to 0.38 g per 100 g water with 6% $SiO_2$ and calcium sesquiborate was reduced from 0.38 to 0.37 g per 100 g water with 6% $SiO_2$. The compound of our invention, however, had its solubility reduced from 0.18 g per 100 g water to 0.10 g per 100 g with 6% silica, to 0.08 g per 100 g water with 11% silica and to 0.06 g per 100 g water with 21% SiO. This greatly reduced solubility of the coated calcium pyroborate allows the formulation of paints and the subsequent deposition of paint films with outstanding resistance to corrosion and attack by mold and fungi.

The alkali metal silicates which may be used in the processes of our invention include the liquid water soluble silicates having a ratio of alkali metal to silica of at least 2.5 grams of silica to each gram of alkali metal calculated as alkali metal oxide. Commercially available products are the liquid silicates of sodium and potassium, having ratios by weight of alkali metal oxide to silica up to 1:3.75 for sodium silicates, and up to 1:2.50 for potassium silicates, but known liquid sodium silicate having a ratio of sodium oxide to silica of 1:4.10 may also be used. In addition, liquid potassium silicate having a ratio of 1 part $K_2O$ to 2.50 parts $SiO_2$ by weight may be used. The preferred liquid silicates, however, are sodium silicates having ratios between about 3.22 and 3.75 grams of silica to each to each gram of sodium oxide ($Na_2O$).

Suitable calcium pyroborates include calcium pyroborate monohydrate (2CaO $B_2O_3$ $H_2O$) and the higher hydrates. In either case the calcium pyroborate used must be in particulate form, that is, it should be of such size that the product after treatment with the liquid silicate, drying and grinding has a diameter not exceeding 40 microns. When the preferred procedure is employed, the calcium pyroborate may be prepared using the following reactions:

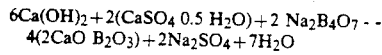  (1)

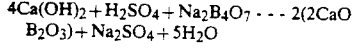  (2)

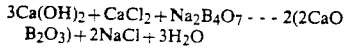  (3)

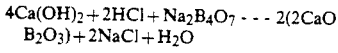  (4)

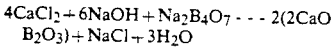  (5)

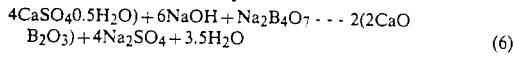  (6)

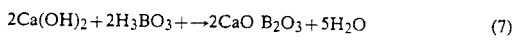  (7)

The reactions above will result in the formation of hydrates of calcium pyroborate but the water molecules have been omitted for purposes of clarity.

Somewhat more specifically and in somewhat greater detail, the process may be described as follows:

In coating the particles of calcium pyroborate effectively it is advantageous to have the liquid alkali metal silicate distributed as uniformly as possible over the surfaces of the particles. For this purpose sufficient water should be present to produce a slurry that can be stirred easily and the amount should be such as not to dilute the liquid alkali metal silicate excessively.

The slurry of calcium pyroborate particles in water containing the liquid alkali metal silicate is then stirred for a sufficient period of time such that an adherent coating is formed on the particles of calcium pyroborate. This can be generally accomplished by stirring for a period of between 1 to 6 or more hours at a temperature between about 15° and 200° C. This treatment binds the silica to the calcium pyroborate particles and extracts residual soluble alkali metal salts that were introduced with the liquid alkali metal silicate.

The nature of the coating of silica that is produced on the calcium pyroborate particles by the processes of the present invention has not been established conclusively. It can be stated, however, that it is not a dense coating. Furthermore, it is pervious to water. The calcium pyroborate particle that is coated has been established by X-ray diffraction examination to be crystalline and identical with otherwise uncoated calcium pyroborate. In addition, the unchanged X-ray diffraction pattern of the coated calcium pyroborate indicates that the silica is present in an amorphous state.

The durability and decorative properties of paint films are greatly influenced by their resistance to mold and bacterial attack. A major cause of disfigurement of exterior paint is the growth of mold in and on the film. Deterioration of paint binders by mold and bacteria contributes significantly to the loss of adhesion.

The choice of a preservative is dictated not only by its initial effectiveness in controlling mold and bacteria, but by its longevity in the film. Calcium pyroborate can be used as a film preservative in some cases but because of its significant water solubility it has limited usefulness. In water-based paints the relatively high water solubility will cause compatibility problems with some resins and surfactants used in these paints. The silica-coated calcium pyroborate has a reduced water-solubility and has fewer compatibility problems. The leaching rates from films of both solvent-thinned and water-thinned paints are much lower than those when conventional calcium and barium borates are used as preservative pigments.

Since paints and particularly primers are used to cover and protect metal surfaces the choice of pigment in these paints is very important and many colored metal containing compounds are used as corrosion inhibiting pigments. Protection of metal surfaces is usually required in the presence of moist environments and the reduced water solubility of silica-coated calcium pyroborate compared to other calcium and barium borates is of equal importance for corrosion inhibition as it is for paint film preservative. Silica-coated calcium pyroborate is a white pigment and is therefore more versatile than colored metal corrosion inhibitors since paints containing the silica-coated calcium pyroborate can be tinted to any desired color.

Paint manufacturers who market a variety of paints must usually stock both mold inhibitors and corrosion inhibitors, one of each for water-based systems and one of each for solvent-based systems. The multifunctional silica-coated calcium pyroborate can replace the four products and provide outstanding film preservation and corrosion inhibition.

In order to obtain optimum mold and corrosion inhibition properties, a use level of 0.25 to 2.0 pounds of silica-modified calcium pyroborate per gallon of paint may be needed. However, more or less can be used depending upon the type of paint and the conditions it is intended to protect against.

In order to disclose the nature of the present invention still more clearly, the following illustrative examples will be given. All ratios referred to are to be measured in parts by weight. It is to be understood that the invention is not to be limited to the specific conditions or details set forth in these examples except insofar as such limitations are specified in the appended claims.

EXAMPLE 1

Preparation of calcium metaborate

A 5 L round-bottom reaction flask equipped with an agitator was charged with 2.5 L of water, 186.7 g (2.52 moles) of calcium hydroxide, 330.6 g (2.28 moles) of calcium sulfate ($CaSO_4.0.5\ H_2O$) and 914.9 g (2.40 moles) of borax ($Na_2B_4O_7.10\ H_2O$). The reaction mixture was agitated for 5 hours at 25° C. and then filtered through a Buchner funnel. The filter cake was washed with water and dried in an oven at 225° C. The white calcium metaborate was a powder with a solubility of 0.27 g per 100 g of water. The product contained 10.4% water and on an anhydrous basis it contained 42.9% CaO and 52.5% $B_2O_3$. Theory: 44.6% CaO and 55.4% $B_2O_3$.

EXAMPLE 2

Preparation of silica-coated calcium metaborate

A 1 L reaction flask equipped with an agitator was charged with 100 g of water and 27.8 g (0.25 mole) calcium chloride ($CaCl_2$) and the mixture was agitated until solution occurred. The flask was then charged with 18.5 g (0.25 mole) of calcium hydroxide, 189.4 g of water, and 95.3 g (0.25 mole) of borax ($Na_2B_4O_7\ 10\ H_2O$). The flask was charged with 14.0 g of sodium silicate solution containing 28.7% $SiO_2$ and 8.9% $Na_2O$. The reaction mixture was stirred for 5 hours at 25° C. and then filtered using a Buchner funnel. The filter cake was washed with 1000 g of water and dried. The white powder obtained had a solubility of 0.26 g per 100 g of water, weighed 67.6 g and contained on an anhydrous basis 6.01% $SiO_2$, 42.1% CaO and 51.9% $B_2O_3$. Theory: 41.9% CaO and 52.1% $B_2O_3$.

EXAMPLE 3

Preparation of silica-coated calcium metaborate

The reaction of Example 2 was repeated except that the reaction mixture was heated for 3 hours at 60° C. The product of this reaction had the same solubility as that of Example 2. On an anhydrous basis the product contained 42.0% CaO, 51.8% $B_2O_3$ and 5.95% $SiO_2$. Theory: 41.9% CaO and 52.1% $B_2O_3$.

EXAMPLE 4

Preparation of calcium pyroborate

A 150 gallon jacketed, stainless steel reactor equipped with an agitator was charged with 200 lb of water and 27.8 lb (0.25 1 lb mole) of calcium chloride ($CaCl_2$) and was then charged with 63.1 lb (0.85 lb mole) of calcium hydroxide [$Ca(OH)_2$] and 200 lb additional water and the contents were heated to 60° C. Then, 104.8 lb (0.275 lb mole) of borax ($Na_2B_4O_7\ 10\ H_2O$) and 203.5 lb of water were added and the contents were agitated and heated at 93° C. for 3 hours. After being cooled to 71° C. the contents were filtered on a continuous straight line filter and washed thoroughly with water. The filter cake was dried in a rotary vacuum drier at 160° C. The white powder had a solubility of 0.17 g per 100 g of water and contained 61.2% CaO and 37.7% $B_2O_3$ on an anhydrous basis. Theory: 61.7% CaO and 38.3% $B_2O_3$.

EXAMPLE 5

Preparation of silica-coated calcium pyroborate

A 500 mL reaction flask equipped with an agitator and heating mantle was charged with 20.0 g (0.18 mole) of calcium chloride ($CaCl_2$) and 75 g of water. When solution had occurred, 45.9 g (0.62 mole) of calcium hydroxide [$Ca(OH)_2$], 153 g of water, 76.2 g (0.20 mole) of borax ($Na_2B_4O_7\ 10\ H_2O$) and 16.2 g of sodium silicate solution containing 28.7% $SiO_2$ and 8.9% of $Na_2O$ were added. The mixture was agitated and heated at 30° C. for 8 hours after which it was filtered on a Buchner funnel. The filter cake was washed with 800 g of water and dried. The silica-coated calcium pyroborate contained 5% $SiO_2$. The ratio of CaO to $B_2O_3$ contained in the product was 1.57 to 1.00. Theory: CaO to $B_2O_3$ ratio, 1.61 to 1.00. The solubility of this product was 0.11 g per 100 g of water at 25° C.

EXAMPLE 6

Preparation of silica-coated calcium pyroborate

A 1 L reaction flask equipped with agitator and heating mantle was charged with 300 g of water, 74 g (1.0 mole) of calcium hydroxide [$Ca(OH)_2$] and 25.5 g (0.25 mole) of 96% sulfuric acid. The mixture was heated to 60° C. and treated with 95.3 g (0.25 mole) of borax ($Na_2B_4O_7\ 10\ H_2O$), 100 g of water, and 20.2 g of sodium silicate solution containing 28.7% $SiO_2$ and 8.5% $Na_2$. The reaction mixture was then heated and agitated at 95° C. for 5 hours, cooled to 50° C. and filtered in a Buchner funnel. The filter cake was washed with water and dried at 250° C. The white solid contained 5.0% $SiO_2$ and had a CaO to $B_2O_3$ ratio of 1.67 to 1.00. Theory for calcium pyroborate: 1.61. The solubility was 0.12 g per 100 g of water at 25° C.

EXAMPLE 7

Preparation of silica-coated calcium pyroborate

A 2 L reaction flask equipped with agitator and heating mantle was charged with 72.6 g (0.5 mole) of calcium sulfate ($CaSO_4\ 0.5\ H_2O$) and 600 g of water and the mixture was heated to 60° C. The flask was then charged with an additional 600 g of water, 190.6 g (0.5 mole) of borax ($Na_2B_4O_7.10\ H_2O$) and 40.4 g of sodium silicate (28.7% $SiO_2$ and 8.9% NaOH) and the reaction mixture heated to 95° C. and maintained at this temperature for five hours. After cooling, the mixture was filtered on a Buchner funnel; solid was washed with water and dried in a 250° oven. The white silica-coated calcium pyroborate contained 49.7% CaO, 30.1% $B_2O_3$, 5.1% silica and 8.7% $H_2O$. Theory: 49.2% CaO; 30.6 $B_2O_3$; and 6.0% $SiO_2$. The solubility of the product was 0.12 g per 100 g of water at 25° C.

EXAMPLE 8

Preparation of silica-coated calcium pyroborate

A 1 L reaction flask equipped with an agitator and heating mantle was charged with 30.5 g (0.275 mole) of calcium chloride ($CaCl_2$) and 200 g of water and agitated until a solution was obtained. The flask was then charged with 53.7 g (0.72 mole) of calcium hydroxide [$Ca(OH)_2$] and 200 g of water and the contents were heated to 60° C. The reaction mixture was then treated with 95.3 g (0.25 mole) of borax ($Na_2B_4O_7.10 H_2O$), 253 g of water and agitated for 15 minutes. Finally, 20.2 g of sodium silicate solution (28.7% $SiO_2$; 8.9% $Na_2O$) were added and the reaction was heated at 95° C. for three hours. It was then cooled to 50° and the mixture was filtered on a Buchner funnel. The solid filter cake was washed with 1,200 g of water and dried at 250° in an oven. The white, silica-coated calcium pyroborate contained 50.9% CaO; 31.7% $B_2O_3$; 6.2% $H_2O$; 5.3% $SiO_2$. Theory 51.0% CaO; 32.9% $B_2O_3$; 6.0% $SiO_2$.

EXAMPLE 9

Preparation of silica-coated calcium pyroborate

A 5 L reaction flask equipped with an agitator was charged with 296.0 g (4.0 moles) of calcium hydroxide [$Ca(OH)_2$] and 1000 g of water. The flask was then charged with 247.2 g (40 moles) of boric acid ($H_3BO_3$). An additional 260.0 g of water was charged. Finally, 81.0 g of sodium silicate solution (28.7% $SiO_2$; 8.9% $Na_2O$) was added. The reaction mixture was agitated for four hours at 25° and then filtered using a Buchner funnel. The filter cake was washed with water and dried at 250° C. in an oven. The white, silica-coated calcium pyroborate contained 46.2% CaO; 31.6% $B_2O_3$; 9.7% $H_2O$; 5.0% $SiO_2$. Theory: 52.3% CaO; 32.5% $B_2O_3$; 5.4% $SiO_2$.

EXAMPLE 10

Preparation of silica-coated pyroborate

A 5 L reaction flask equipped with an agitator was charged with 296.0 g (4.0 moles) of calcium hydroxide [$Ca(OH)_2$] and 1000 g of water. The flask was then charged with 247.2 g (4.0 moles) of boric acid ($H_3BO_3$). An additional 230.0 g of water was charged. Finally, 172.6 g of sodium silicate solution (28.7% $SiO_2$; 8.9% $Na_2O$) was added. The reaction mixture was agitated for four hours at 25° C. and the filtered using a Buchner funnel. The filter cake was washed with water and dryed at 250° C. in an oven. The white, silica-coated calcium pyroborate contained 42.0% CaO; 30.4% $B_2O_3$; 10.2% $H_2O$; 9.9% $SiO_2$. Theory: 48.9% CaO; 30.4% $B_2O_3$; 10.8% $SiO_2$.

EXAMPLE 11

Preparation of silica-coated calcium pyroborate

A 150 gallon jacketed, stainless steel reactor equipped with an agitator was charged with 40.4 lb (0.36 lb mole) of calcium chloride and 150 lb of water and the mixture was agitated until solution occurred. The reactor was then charged with 91.8 lb (1.24 lb mole) of calcium hydroxide [$Ca(OH)_2$], 150 lb of water, 152.4 lb (0.40 lb mole) of borax ($Na_2B_4O_7.10 H_2O$) and an additional 156 lb of water. The mixture was agitated 15 minutes and treated with 324 lb of a solution of sodium silicate (28.7% $SiO_2$; 8.9% $Na_2O$). The reaction mixture was then agitated for five hours at 110° F., filtered on a continuous straight-line filter, and the solid was washed with water. The solid was dried in a rotary vacuum drier at 325° F. The white, silica-coated calcium pyroborate had a solubility of 0.12 g in a 100 g of water at 25° C. and contained 47.3% CaO; 31.7% $B_2O_3$; 13.8% $H_2O$; 5.5% $SiO_2$. Theory: 48.7% CaO; 30.3% $B_2O_3$; 6.0% $SiO_2$.

EXAMPLE 12

The reaction of Example 11 was repeated in the 150 gallon reactor using an increased amount of sodium silicate so as to provide 10.0% $SiO_2$ in the final product. The white, silica-coated calcium pyroborate had a solubility of 0.11 g in 100 g of water at 25° C. and contained 46.1% CaO; 28.6% $B_2O_3$; 13.4% $H_2O$; 8.3% $SiO_2$. Theory: 46.1% CaO; 28.6% $B_2O_3$; 10.0% $SiO_2$.

EXAMPLE 13

Solubility Determination

The solubility of the compositions of this invention was determined by forming a slurry consisting of 15 g of the compound and 300 g of water at 25° C., agitating the slurry for three hours, filtering, and analyzing the filtrate for solids content. The filter cake was reslurried and the process repeated until a consistent solids content was obtained.

For example, a calcium pyroborate with 10% silica had a solids content in the water extract of 0.24% after the 1st extract, 0.16% after the 2nd extract, 0.07% after the 3rd extract and 0.07% after the 7th extract.

Higher percentages of total solids found in the first two extracts are indicative primarily of particles of calcium pyroborate that have not been adequately coated or whose silica coating has been abraded. Impurities due to inadequate washing before drying may also be responsible. Generally, however, all such soluble and uncoated or partially coated particles in the product sample are removed in the first and second extractions and third and subsequent extracts have a lower and consistent solids content.

EXAMPLE 14

Effectiveness of silica-coated calcium pyroborate as a corrosion inhibitor in paint Silica-modified calcium pyroborate samples were formulated into medium oil alkyd primer paints at 0.5 and 1.0 pound/gallon. Salt fog tests were run according to ASTM B117 which specified a 5% NaCl solution and a temperature of 95° F. Painted metal panels were graded for rusting according to ASTM D610 and for blistering according to ASTM D714. After 450 hours control panels exhibited heavy rusting and blistering. Panels with paint containing the calcium pyroborate with 6 and 10% silica exhibited no rusting or blistering. Silica-modified calcium pyroborate was a superior corrosion inhibitor to the silica-modified barium metaborate. The results of this test are included in Table 1. On the scale of 1 to 10, 1 indicates severe blistering or rusting and 10 indicates no blistering or rusting.

TABLE 1

Corrosion inhibition provided by an alkyd paint formulated with silica-coated calcium pyroborate

| Sample | Silica Content Percent | Pounds per gallon Pounds | Blistering 100 | 200 | 450 | Rusting 100 | 200 | 450 |
|---|---|---|---|---|---|---|---|---|
| | | | | | Hours | | | |
| 2 CaO.B$_2$O$_3$ | 0 | 0.5 | 10 | 10 | 6 | 10 | 10 | 7.8 |
| | | 1.0 | 8 | 8 | 4 | 3 | 3 | 2 |
| 2 CaO.B$_2$O$_3$ | 6 | 0.5 | 10 | 10 | 10 | 4 | 10 | 10 |
| | | 1.0 | 10 | 10 | 10 | 10 | 10 | 10 |
| 2 CaO.B$_2$O$_3$ | 11 | 0.5 | 10 | 10 | 6 | 10 | 10 | 10 |
| | | 1.0 | 10 | 10 | 10 | 10 | 10 | 10 |
| 2 CaO.B$_2$O$_3$ | 21 | 0.5 | 6 | 5 | 3 | 10 | 7–8 | 2 |
| | | 1.0 | 8 | 8 | 4 | 1 | 1 | 1 |
| 2 CaO.B$_2$O$_3$ | 33 | 0.5 | 6 | 4 | 2 | 9 | 4 | 2 |
| | | 1.0 | 8 | 8 | 6 | 1 | 1 | 1 |
| BaO.B$_2$O$_3$ | 5 | 0.5 | 8 | 8 | 2 | 10 | 10 | 4–5 |
| | | 1.0 | 10 | 8 | 3 | 10 | 10 | 8–9 |
| Control | 0 | 0 | 2 | 2 | 2 | 9 | 3 | 1 |

EXAMPLE 15

Effectiveness of silica-coated calcium pyroborate as a fungicide for paint films Alkyd and latex paints containing 0.5 to 1.0 pound per gallon of silica-coated calcium pyroborate were evaluated for their resistance to mold growth in a tropical chamber at 90°±2° F. and 95 to 98% relative humidity in accordance with ASTM D-3273-73T. The tropical chamber contained soil inoculated with *Ascercillus niger, Aspergillus oryzae*, and a species of *penicillium*. After 4 weeks, the resistance of the paint films to the growth of mold was measured on a scale of 1 to 10 where 1 was heavy growth and 10 was no growth. Paints containing the silica-coated calcium pyroborate pigments had little or no mold growth as compared to a control paint with no film preservative.

A latex paint containing 0.5 and 1.0 lb per gallon of a calcium pyroborate containing 6% of silica had ratings of 8.5 and 9.0 respectively and with a calcium pyroborate containing 10% of silica, the ratings were 9.5 and 10 respectively. A paint containing 0.5 and 1.0 lb per gallon of silica-coated barium metaborate had a rating of 8.5 and 9.5 respectively whereas a control paint with no preservative rated at zero.

In an alkyd paint both of the calcium pyroborate samples added at 0.5 and 1.0 lb per gallon provided ratings of 10 at both concentrations. The paint with 0.5 and 1.0 lb per gallon of barium metaborate containing 5% of silica had ratings of 7.5 and 10 respectively and the control with no preservative was again rated zero.

What is claimed is:

1. A silica-coated calcium pyroborate pigment in particulate form having an effective diameter of less than 40 microns, comprising hydrated calcium pyroborate hydrogen bonded to a polymerized amorphous hydrated silica containing both Si—O—Si and Si—OH bonds.

2. The pigment of claim 1 wherein the amount of silica varies from 3 to 25 percent based on the weight of the calcium pyroborate.

3. A silica-coated calcium pyroborate pigment in particulate form having an effective diameter of less than 40 microns, comprising hydrated calcium pyroborate hydrogen bonded to a polymerized amorphous hydrated silica containing both Si—O—Si and Si—OH bonds, wherein the CaO content varies from 45 to 61%, the B$_2$O$_3$ content varies from 28 to 38%, and the SiO$_2$ content varies from 3 to 25% all calculated on an anhydrous basis.

4. The silica-coated calcium pyroborate pigment of claim 1 characterized in that the solubility of said pigment is between 0.05 to 0.12 part per 100 parts of water at 25° C.

5. The silica-coated calcium pyroborate pigment of claim 1 wherein said calcium pyroborate is calcium pyroborate monohydrate.

6. A silica-coated calcium pigment formed by the precipitation of calcium pyroborate from a reaction mixture of a calcium salt and borax or boric acid in the presence of at least one liquid alkali metal silicate to form said silica-coated pigment.

7. The silica-coated calcium pyroborate pigment of claim 6, wherein said calcium salt is selected from the group consisting of calcium oxide, calcium hydroxide, calcium sulfate, and calcium chloride.

8. A silica-coated calcium pyroborate pigment formed by contacting calcium pyroborate particles with aqueous liquid alkali metal silicate in an aqueous environment.

9. The silica-coated calcium pyroborate pigment of claim 8 wherein said liquid alkali metal silicate has a ratio by weight of alkali metal oxide to silica of from 1:2.50 to 1:4.10.

10. The silica-coated calcium pyroborate pigment of claim 9 wherein said liquid alkali metal silicate has a ratio by weight of alkali metal oxide to silica is 1:3.75.

11. The silica-coated calcium pyroborate pigment of claim 8, wherein said liquid alkali metal silicate is sodium silicate.

12. The silica-coated calcium pyroborate pigment of claim 11, wherein said liquid alkali metal silicate is potassium silicate.

13. A paint containing as a pigment the silica-coated calcium pyroborate pigment of claim 1.

14. The paint as claimed in claim 13 wherein the amount of silica varies from 3 to 25% based on the weight of the calcium pyroborate.

15. A corrosion inhibitor containing as a pigment the silica-coated calcium pyroborate pigment of claim 1.

16. A film preservative containing as a pigment the silica-coated calcium pyroborate pigment of claim 1.

* * * * *

UNITED STATES PATENT AND TRADEMARK OFFICE
CERTIFICATE OF CORRECTION

PATENT NO. : 5,066,334

DATED : November 19, 1991

INVENTOR(S) : John D. PERA and Loel L. Hickman

It is certified that error appears in the above-identified patent and that said Letters Patent is hereby corrected as shown below:

Claim 6, column 10, line 35, after "silica-coated" insert --calcium--.

Signed and Sealed this

Twentieth Day of April, 1993

Attest:

MICHAEL K. KIRK

*Attesting Officer*  *Acting Commissioner of Patents and Trademarks*